United States Patent [19]

Battaglini

[11] Patent Number: 4,913,098
[45] Date of Patent: Apr. 3, 1990

[54] WASTE MEAT STEAM SUPERCHARGER

[76] Inventor: Robert G. Battaglini, 111 Woodview La., Media, Pa. 19063

[21] Appl. No.: 166,468

[22] Filed: Mar. 10, 1988

[51] Int. Cl.⁴ .............................................. F02D 19/00
[52] U.S. Cl. ................................. 123/25 P; 123/559.1
[58] Field of Search ................. 123/25 P; 60/618, 712

[56] References Cited
U.S. PATENT DOCUMENTS

| | | | |
|---|---|---|---|
| 1,433,185 | 10/1922 | De Costa | 123/25 |
| 1,799,684 | 4/1931 | Gilbert et al. | 123/25 |
| 2,965,083 | 12/1960 | Percival | 123/559.1 |
| 3,896,775 | 7/1975 | Melby | 123/559.1 |
| 3,919,988 | 11/1975 | Bun | 123/25 B |
| 4,027,630 | 6/1977 | Giardini | 123/25 P |
| 4,059,078 | 11/1977 | de la Rosa | 123/25 K |
| 4,078,527 | 3/1978 | Yasuda | 123/25 B |
| 4,201,058 | 5/1980 | Vaughan | 60/618 |
| 4,322,950 | 4/1982 | Jepsen | 60/712 |
| 4,346,675 | 8/1982 | Holliday Jr. | 123/25 P |
| 4,359,971 | 11/1982 | Rogers | 123/25 P |
| 4,402,182 | 9/1983 | Miller | 123/25 P |
| 4,411,224 | 10/1983 | Goodman | 123/25 A |
| 4,466,386 | 8/1984 | Silva | 123/125 B |
| 4,476,817 | 10/1984 | Lindberg | 123/25 P |
| 4,558,665 | 12/1985 | Sandberg et al. | 123/25 P |

Primary Examiner—E. Rollins Cross
Attorney, Agent, or Firm—Lipton, Famiglio & Elman

[57] ABSTRACT

A system for supercharging an internal combustion engine. In the present invention, waste heat from an internal combustion engine heats surrounding coolant water to make steam. Steam then passes through a steam compressor, which feeds a high-velocity stream of steam to the intake manifold of the combustion chamber of the engine. This stream draws air and fuel vapor to it, and the resulting supercharged mixture is injected into the combustion chamber of the engine. The high-pressure super-charged mixture exerts pressure on the piston during the intake stroke, increases the pressure inside the combustion chamber, absorbs more heat during combustion, and gathers the engine's waste heat into a high-energy exhaust stream. As a result, the fuel burns more efficiently, less heat is lost from the combustion chamber, engine knocking decreases, thermal stress is reduced, fewer nitrogen oxide pollutants are produced, and the exhaust stream may be used for by-product power generation. In sum, the engine's power output is increased without a corresponding increase in fuel input.

27 Claims, 4 Drawing Sheets

WASTE MEAT STEAM SUPERCHARGER

BACKGROUND OF THE INVENTION

The present invention pertains to means for using steam in internal combustion engines to provide better engine efficiency.

Gas turbines have some advantages in efficiency over other forms of internal combustion engines. Gas turbines use regenerators and intercoolers to take advantage of energy that would otherwise be lost as waste heat. Moreover, waste heat is gathered and expelled through the exhaust, leaving a high energy exhaust stream suitable for by-product power generation.

Conventional internal combustion engines, on the other hand, are only about 30% efficient—they only convert 30% of the energy put into them into work. Friction, turbulence, loss of heat to cylinder walls, incomplete combustion and many other effects combine to reduce efficiency. Conventional engines also generate a lot of heat and require means to irradiate heat. Moreover, conventional engines release nitrogen oxide pollutants through their exhaust.

The present invention adapts conventional internal combustion engines so that they will have many of the advantages of gas turbines.

An internal combustion engine operates by a series of energy conversions. The process begins with the chemical reaction between the oxygen in air and a combustible fuel. When the oxygen and fuel react in the combustion chamber of the engine, the chemical energy is converted to heat energy. The resulting heated gas expands and causes the piston to move, thus converting heat energy to mechanical energy.

Engines lose efficiency at each one of these conversions. Not all of the fuel combusts, and carbon monoxide and unburned hydrocarbons pass through the exhaust. The walls of the combustion chamber allow heat to escape, so that not all of the heat energy generated contributes to movement of the piston. Moreover, this escaping heat can be destructive, requiring a jacket coolant water supply. Jacket water, however, traps heat energy in unusable levels.

Various methods of increasing engine efficiency exist in the prior art. Prior art engine designs generally increase either the mass or temperature inside the combustion chamber to increase the pressure therein.

Steam injection is one method to increase engine efficiency existing in the prior art. Steam is a good, inexpensive, readily available medium to transfer heat and can absorb heat inside the combustion chamber. One can thus increase the total heat and pressure inside the combustion chamber by injecting steam into it. Various engine designs of the prior art use steam this way.

Supercharging and turbocharging are other methods of increasing engine efficiency. Supercharging generally refers to a compressor mechanically driven by the engine, while turbo-charging generally refers to a compressor driven by exhaust gases. Superchargers and turbochargers increase the heat energy produced in the combustion chamber by increasing the pressure of the air (and fuel in the case of a diesel engine) entering the combustion chamber, thus increasing the mass. Various existing engines use supercharging and turbocharging in this way.

The gains in efficiency of steam injection, turbocharging, and supercharging may be offset, however, if the engine has to burn more fuel to produce the steam or to charge the combustion chamber. Waste heat from the engine, however, may provide sufficient energy to produce the required steam. If a supply of water can absorb the engine's waste heat, so that at least a portion of the water boils, then the engine can produce steam without burning extra fuel. This steam, in turn, can be used in a steam compressor to produce the supercharging effect.

Presently, no method or structure exists for using a steam compressor in combination with an internal combustion engine. Steam injection, on the other hand, is known in the prior art. Some inventions also use waste heat to make steam for steam injection. Other inventions use turbochargers or water injection. None of these prior art inventions use waste heat steam to supercharge the engine.

SUMMARY OF THE INVENTION

The present invention increases the power output of internal combustion engines without correspondingly increasing the input of combustible fuel. This result is accomplished by using a steam supercharger to inject steam and air into the combustion chamber of the engine. The combustible fuel burns more evenly, so that the engine does not knock as much as do existing engines. Waste heat from the engine cooling jacket supplies the energy to produce the steam. The invention cools the engine, as well, because it draws steam from the engine's jacket coolant water supply.

Although steam compressors are well known, they have not previously been used to supercharge internal combustion engines. The venturi nozzle of a steam compressor may be used to increase the total pressure in the outlet pipe. Because of the high pressure of the compressed steam, a stream of steam squirts from the venturi nozzle at a high velocity. This high velocity stream causes a local area of low pressure surrounding it. When this stream is exposed to a supply of air, a greater-than-normal mass of air flows to the low pressure area. By this action, a steam compressor can be used to supercharge an engine. Hereinafter, a steam compressor that is used in this way to supercharge an engine shall be called a "steam supercharger."

The present invention is used with an internal combustion diesel, gasoline, or gas engine with a coolant water system. Waste heat from the engine heats the coolant water, which then flows into a steam separator. The steam separator supplies steam to a steam supercharger. In ebullient-cooled engines, the steam separator is unnecessary.

As noted previously herein, the steam emitted by the steam supercharger draws a greater mass of air into the intake manifold than is present in conventional engine systems. There is, therefore, more air, steam, and slightly more fuel in the intake manifold in this invention than in conventional engines. The resulting high-pressure mixture then flows to the lower pressure area inside the combustion chamber. The mixture pushes down on the piston due to its high-pressure. The mixture thus performs work even on the intake stroke, similar to the bottoming cycle of a steam engine.

After it is inside the combustion chamber, the steam present at the instant of combustion absorbs more heat and expands to produce more pressure on the piston. The steam also lowers the temperature in the combustion chamber by absorbing more heat, which reduces both the heat lost during combustion and the thermal stress upon the engine. Furthermore, this heat absorption largely removes nitrogen oxide pollutants from the exhaust, because the resulting temperature is lower than the level at which such pollutants are produced.

The high-pressure, "supercharged" mixture in the combustion chamber increases the engine's power output. Since more mass is present at combustion, more heat is absorbed during combustion. Since the mixture is under greater pressure, more fuel combusts. The resulting combustion products are at higher pressure, and so exert greater force on the piston. Steam super-charging thus increases the amount of work done by the engine.

After combustion, the steam and combustion products pass to the exhaust, carrying the heat absorbed by the steam to the exhaust stream. Thus, the invention gathers together the waste heat energy into the exhaust stream, as do the regenerators and intercoolers of gas turbines. The exhaust stream may be tied to a boiler to produce steam for a second steam supercharger or for other purposes.

Because waste heat is used to make the steam used to supercharge the engine, no additional energy input is needed to supercharge the engine than is needed in a conventional system. Instead, the present invention recaptures energy that would otherwise be lost as waste heat and applies it to the work output of the engine. Conventional superchargers, in contrast, are air pumps connected directly to the crankshaft by belts, so that they give the supercharging effect at the price of fuel economy. Turbochargers use exhaust gas as a source of heat energy, but are self-limiting because they create back-pressure effects on the combustion chamber. The present invention conserves fuel economy by using waste jacket water heat with no back-pressure effects.

Accordingly, it is the object of this invention to provide a means to increase the power output of internal combustion engines that does not correspondingly increase the combustible fuel required.

It is also an object of this invention to use steam to decrease the combustion temperature below destructive levels.

It is another object of this invention to recapture the heat energy from an engine cooling jacket and upgrade the coolant water's temperature to a more usable level.

It is still another object of this invention to provide means that reduce engine knocking.

It is a further object of this invention to provide means to reduce the amount of nitrogen oxide pollutants release through the engine exhaust.

A more detailed description of the drawings is included in the following description of preferred embodiments.

DESCRIPTION OF PREFERRED EMBODIMENTS

Figure 1:
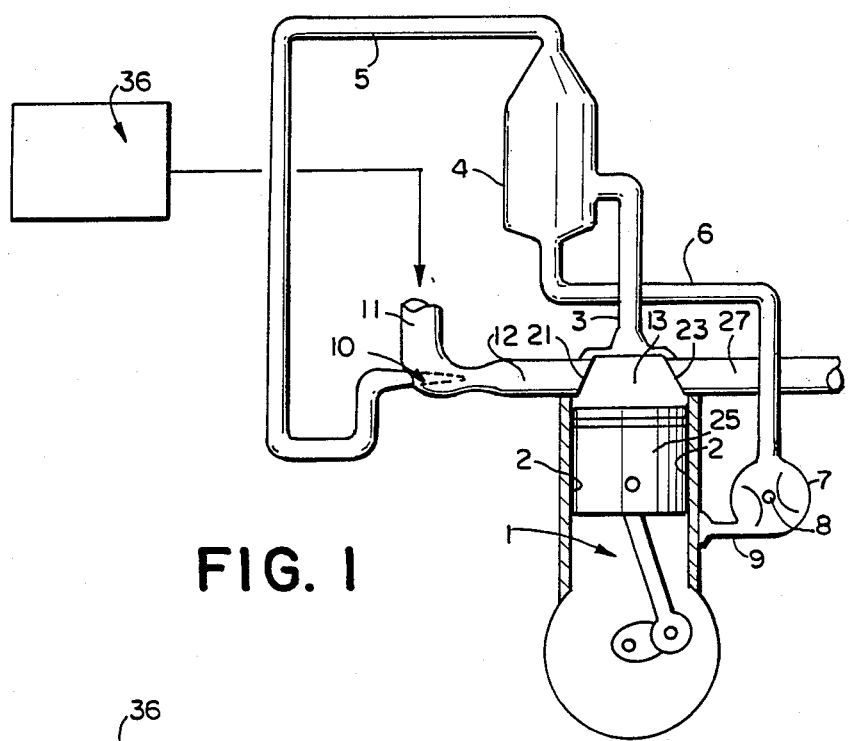
FIG. 1 is a schematic drawing of a preferred embodiment of the invention.

FIG. 1 includes a conventional diesel, gasoline or gas engine 1 flanked by a jacket coolant water system 2. Waste heat from the engine heats up the coolant water.

The heated coolant water leaves the coolant water system 2 by the coolant water output pipe 3. The coolant water output pipe 3 feeds the heated coolant water to the steam separator 4. Inside the steam separator 4, the steam from the heated coolant water leaves the steam separator by the steam output pipe 5. The unused coolant water leaves the steam separator 4 by the coolant water return pipe 6. The invention thus cools the engine by removing heat in the steam separator. The engine does not need a radiator because the steam separator rejects heat.

The coolant water return pipe 6 returns the water to the water pump chamber 7. The water pump 8 inside the chamber 7 pumps the unused coolant water through the coolant return port 9 and back into the coolant water system 2.

The steam from the steam separator 4 flows through the steam output pipe 5 to the steam supercharger 10. The steam supercharger 10 and air pipe 11 are connected to the intake pipe 12. In the preferred embodiment, the steam supercharger 10 is a venturi compressor. Because of the action of the steam super-charger 10, the intake pipe 12 feeds steam and supercharged gas to the combustion chamber 13.

The air pipe 11 may be connected to numerous sources.

It may supply outside air, or it may be connected to a carburetor or filter. In FIGS. 1-4 a reactant mixer 36 supplies combustible reactants to air pipe 11. The combustible reactants mixer may be either a carburetor, a supercharger or a turbocharger. As in conventional engines, the carburetor emits a mixture of air and gasoline vapor.

Figure 2:
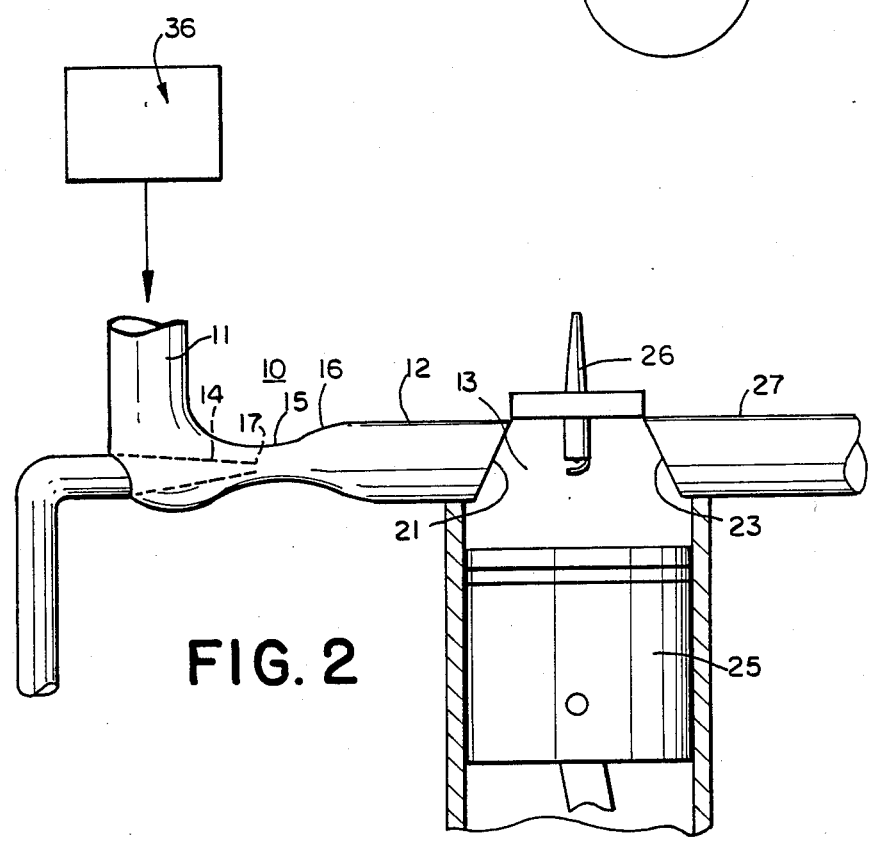
FIG. 2 is a schematic drawing of the steam supercharger, intake pipe, and combustion chamber.

FIG. 2 shows more clearly the action of the steam supercharger. The steam supercharger 10 consists of a steam pipe 14 with a steadily decreasing radius, in conjunction with an air pipe that constricts to a small radius 15 around the steam nozzle 17 but then increases in radius 16 to the intake pipe 12. Steam from the steam separator squirts out of the nozzle 17 into the intake pipe 12. The velocity of the squirted stream of steam creates a local area of low pressure around the stream. The air and gasoline vapor inside air pipe 11, therefore, rush into the intake pipe 12 and increase the pressure therein. The intake pipe is thus able to inject a greater-than-normal mass into the combustion chamber 13.

FIG. 2 also shows the intake valve 21, exhaust valve 23, piston 25, and spark plug or injector 26. The supercharged mixture passes through the intake valve 21 during the intake stroke of the engine cycle. The greater mass inside the combustion chamber absorbs more heat and produces more pressure inside the combustion chamber both before and after combustion. On the intake stroke, the supercharged mixture actually pushes down the piston 25, thus producing work even on the intake stroke. After the instant of combustion, the combustion products are under higher pressure than in conventional engines, so that they produce greater work during the power stroke by pushing down with greater force on the piston. The combustion products then pass through the exhaust valve 23 to the exhaust pipe 27 as in conventional engines. With this invention, however, the exhaust has a greater mass flow, is at a lower temperature, and contains almost all the waste energy.

Figure 3:
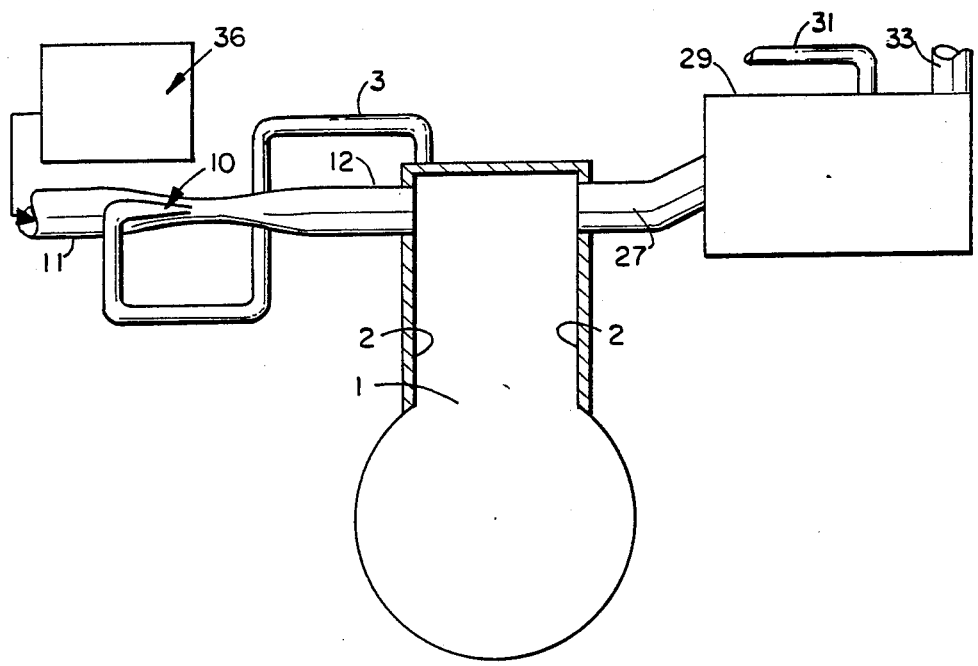
FIG. 3 is a schematic drawing of an alternative embodiment incorporating a boiler driven by the exhaust.

FIG. 3 is a schematic drawing of an alternative embodiment designed to exploit the heat energy in the exhaust. (The engine here is ebullient-cooled, so a steam separator is unnecessary.) In this embodiment, the exhaust valve 23 shown in FIG. 2 feeds into an exhaust pipe 27. The exhaust pipe 27 then passes through a boiler 29, which contains a second water supply. The heat from the exhaust boils the water. An appropriate boiler can make high pressure steam suitable for many purposes. This steam flows out of the boiler by steam output pipe 31. The spent exhaust leaves the system by exhaust pipe 33.

Figure 4:
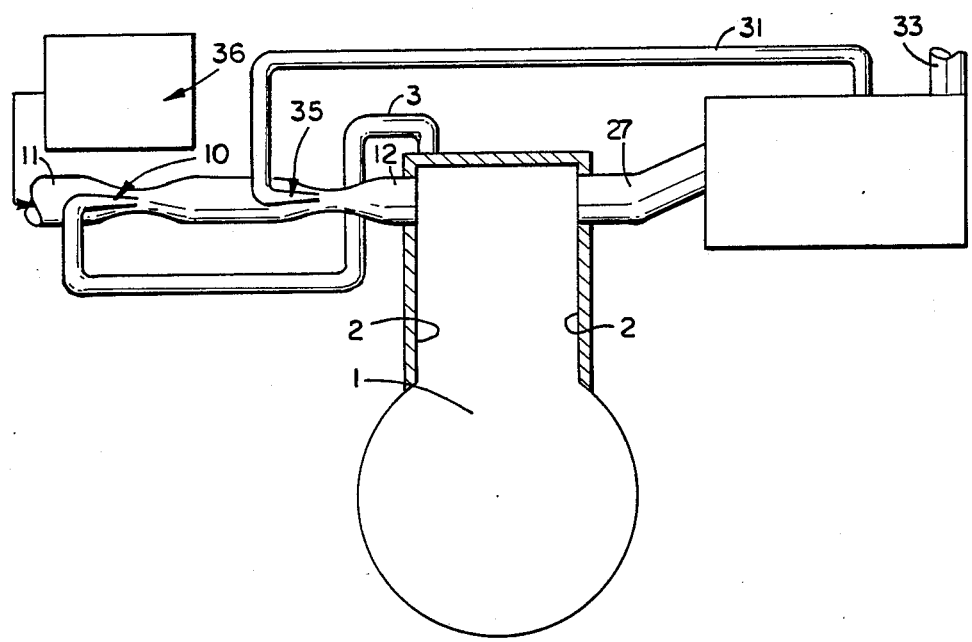
FIG. 4 is another alternative embodiment, including a second steam supercharger.

FIG. 4 shows an alternative embodiment that builds on the embodiment shown in FIG. 3. In FIG. 4, the steam output pipe 31 feeds steam to a second steam supercharger 35. Supercharger 35 ties into an extended intake pipe 12 and operates the same way as supercharger 10 but at a higher pressure. The supercharged mixture is thus supercharged again to increase the desirable effects of supercharging.

There are various changes and modifications that may be made to applicant's invention, as would be apparent to those skilled in the art. However, any of these changes or modifications are included in the teaching of applicant's disclosure, and it is intended that the present invention be limited only by the scope of the claims appended hereto.

What is claimed is:

1. A steam supercharger for an internal combustion engine comprising:
   a. an intake pipe;
   b. a means for generating steam;
   c. a first inlet means for providing a mixture of combustible reactants to said intake pipe; and
   d. a second inlet means for injecting said steam into said intake pipe
   wherein the intake pipe supplies to the combustion chamber of the internal combustion engine the steam and combustible reactants combined in the intake pipe.

2. The steam supercharager of claim 1 wherein the means for generating steam is a steam separator in the engine coolant system.

3. The steam supercharger of claim 1 wherein the means for generating steam is the steam released in the ebullient cooling of the engine.

4. The steam supercharger of claim 1 wherein the means for generating steam further comprises a heat exchanger in which the hot exhaust gases from the internal combustion engine heat water to steam.

5. The steam supercharger of claim 1 wherein the inlet means for injecting steam is a venturi compressor.

6. The steam supercharger of claim 1 wherein the inlet means for providing a mixture of combustible reactants is a carburetor.

7. The steam supercharger of claim 1 wherein the inlet means for providing a mixture of combustible reactants is a supercharger.

8. The steam supercharger of claim 1 wherein the inlet means for providing a mixture of combustible reactants is a turbocharger.

9. The steam supercharger of claim 1 further comprising a second inlet means for injecting steam into the intake pipe.

10. The steam supercharger of claim 31 wherein the second inlet means for injecting steam is a venturi compressor.

11. The method for steam supercharging an internal combustion engine comprising the steps of:
    a. generating steam;
    b. mixing combustible reactants;
    c. injecting the steam into the mixture of combustible reactants; and
    d. supplying the resulting supercharged mixture to a combustion chamber of an internal combustion engine.

12. The method of claim 11 further comprising the additional step of injecting steam a second time into the mixture of combustible reactants and steam.

13. The method of claim 11 wherein a carburetor mixes the combustible reactants.

14. The method of claim 11 wherein a supercharger mixes the combustible reactants.

15. The method of claim 11 wherein a turbocharger mixes the combustible reactants.

16. The method of claim 11 wherein steam is generated by a steam separator in the engine coolant system.

17. The method of claim 11 wherein steam is generated by the ebullient cooling of the engine.

18. The method of claim 11 wherein steam is generated by a heat exchanger in which the hot exhaust gases from the internal combustion engine heat water to steam.

19. The method for recovering and upgrading to more useful form the waste heat of an internal combustion engine by rejecting it into the engine so that the net BTU content of the exhaust gases is increased comprising the steps of:
    a. generating steam using waste heat from the engine;
    b. mixing combustible reactants;
    c. injecting the steam into the mixture of combustible reactants; and
    d. supplying the resulting mixture to a combustion chamber of the internal combustion engine
    wherein the exhaust has a greater mass flow and contains the heat energy which otherwise would have been wasted.

20. The method of claim 19 further comprising the additional step of injecting steam a second time into the mixture of combustible reactants and steam.

21. The method of claim 19 wherein a carburetor mixes the combustible reactants.

22. The method of claim 19 wherein a supercharger mixes the combustible reactants.

23. The method of claim 19 wherein a turbocharger mixes the combustible reactants.

24. The method of claim 19 wherein steam is generated by a steam separator in the engine coolant system.

25. The method of claim 19 wherein steam is generated by the ebullient cooling of the engine.

26. The method of claim 19 wherein the steam is generated by a heat exchanger in which the hot exhaust gases from the internal combustion engine heat water to steam.

27. The method of claim 19 further comprising the additional step of heating water in an unfired boiler with the exhaust gases produced by the engine to make high pressure steam.

* * * * *

UNITED STATES PATENT AND TRADEMARK OFFICE
CERTIFICATE OF CORRECTION

PATENT NO. : 4,913,098

DATED : April 3, 1990

INVENTOR(S) : Robert G. Battaglini

It is certified that error appears in the above-identified patent and that said Letters Patent is hereby corrected as shown below:

On the title page, item [54] should read --WASTE HEAT STEAM SUPERCHARGER--.

Signed and Sealed this

Sixteenth Day of March, 1993

Attest:

STEPHEN G. KUNIN

Attesting Officer

Acting Commissioner of Patents and Trademarks